Nov. 25, 1947.　　　O. L. MacSORLEY　　　2,431,408
CONTROL SYSTEM FOR AUTOMATIC SELECTOR MECHANISM
Filed Oct. 28, 1944　　　2 Sheets-Sheet 1

INVENTOR
OLIN L. MacSORLEY
by H. G. Grover
ATTORNEY.

Patented Nov. 25, 1947

2,431,408

UNITED STATES PATENT OFFICE 2,431,408

CONTROL SYSTEM FOR AUTOMATIC SELECTOR MECHANISM

Olin L. MacSorley, Palmyra, N. J., assignor to Radio Corporation of America, a corporation of Delaware Application October 28, 1944, Serial No. 560,816

12 Claims. (Cl. 318—33)

The present invention relates in general to a control system for an automatic selector mechanism, and more particularly to a control system for effecting the proper sequential and automatic operation of the various component elements of such mechanism.

Automatic selectors of the type mentioned are used in conjunction with radio equipment for selection of one of a plurality of predetermined channel frequencies. If desired, such selection may be made from a remote point. It has been found that automatic selectors of the prior art are not entirely reliable and dependable under certain conditions. For example, once the manual control switch in such prior art devices is set to one position, it is not always possible, before the completion of the cycle of operation corresponding to that setting, to change to another position and obtain the setting desired. Operation of the control switch to a different setting before the completion of the cycle due to the first setting may result, depending upon the point in the cycle at which the change is made and the relative settings of the old and new positions, in the failure of the mechanism to choose the desired setting. In other words, should the control switch be actuated to an incorrect setting it may be necessary in the use of prior devices that the adjustment of the selector mechanism corresponding to that setting be completed before the control switch can be adjusted to the correct setting to effect the desired adjustment with an assurance of obtaining the desired results. It is of course desirable to be able to rectify at once erroneous settings of the control switch and thereby prevent false operation.

It is therefore an object of the present invention to provide a control system which will be devoid of the above disadvantages and which will enable effective control of the selector to be exercised at all times. To this end I have invented the improved combinations of electrical circuits and electrically-controlled elements described and claimed herein.

Figure 1:
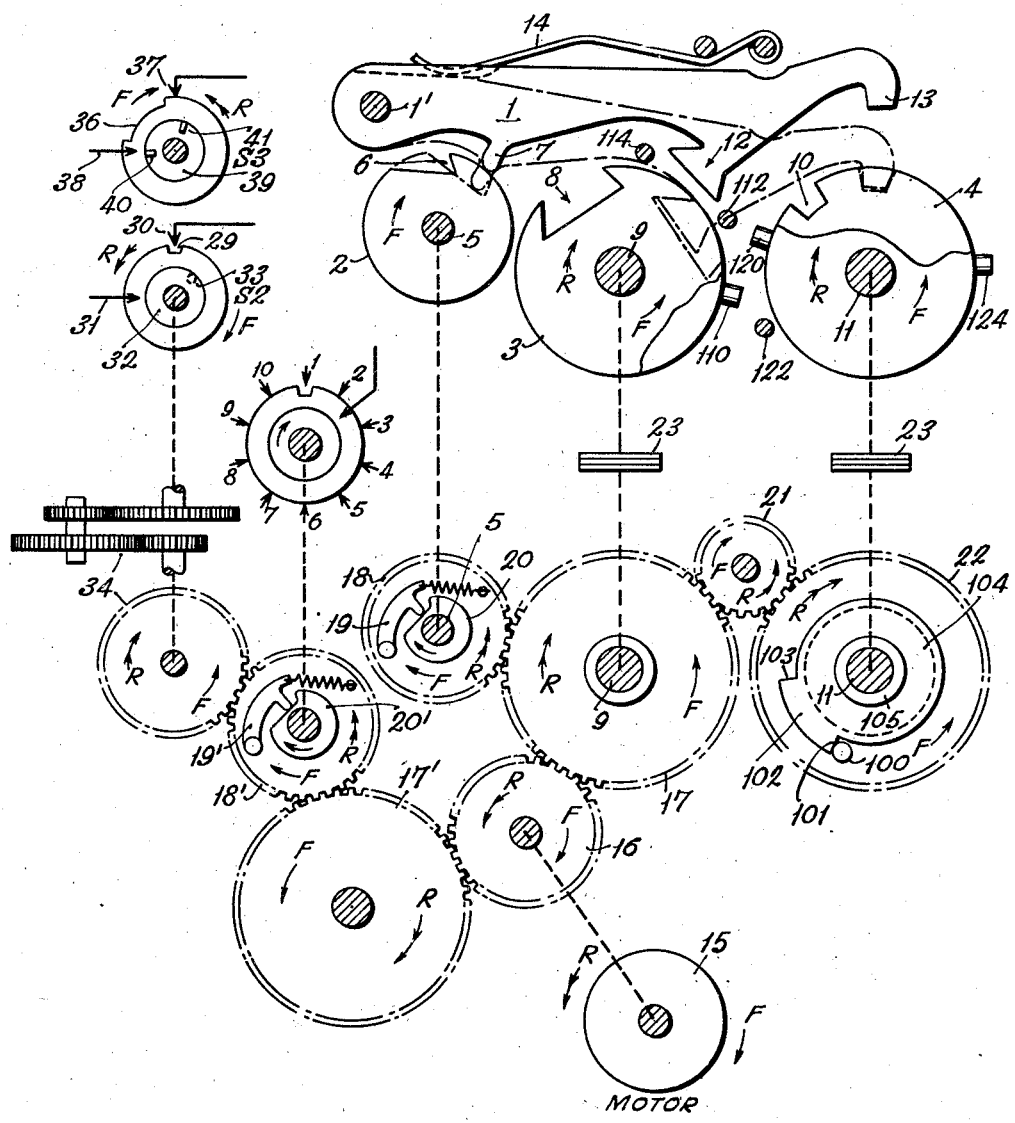
Figure 2:
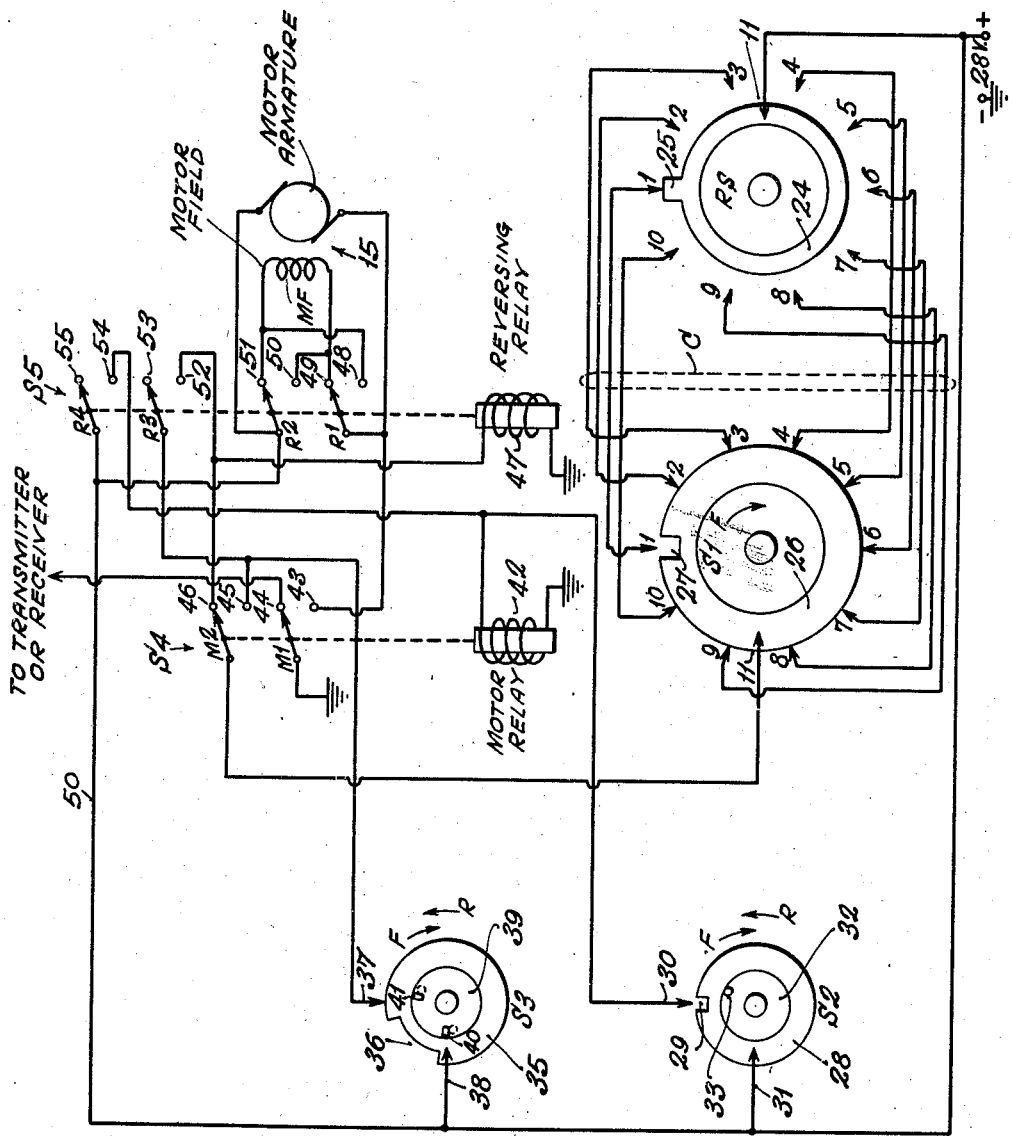

Other objects and advantages of the invention will become apparent from the following description when read in conjunction with the accompanying drawings in which:

Fig. 1 shows in schematic fashion the main elements of a selector mechanism to which the control system of the present invention is particularly applicable; and Fig. 2 is a wiring diagram of the control system per se.

For illustrative purposes the selector mechanism shown schematically in Fig. 1 is that disclosed and claimed in an application of F. G. Eskuchen, Ser. No. 560,818, filed concurrently herewith, and assigned to the same assignee as the present application. Except for reference numerals this figure is the same as Fig. 7 of the Eskuchen application.

Briefly, the mechanism includes a plurality of stop levers or arms, an equal number of cam discs, an equal number of first selector discs and an equal number of second selector discs, the number being a matter of choice and being determined by how many predetermined positions of adjustment it is desired to provide for the devices to be adjusted. In Fig. 1, one of the stop levers is shown at 1, and its corresponding cam disc, first selector disc and second selector disc are shown at 2, 3 and 4, respectively. The several cam discs are fixedly mounted on a shaft 5 and each is provided with a peripheral notch 6 which, in reference to the notches of the adjacent discs, one on either side thereof, is equi-angularly spaced therefrom, the several notches being arranged in a spiral formation, so that upon rotation of the cam shaft first one and then another of the notches will arrive in succession at a point where each will receive a cam follower 7 of the stop lever corresponding to the cam disc then effective.

Each disc 3 of the first selector disc assembly is provided with a peripheral notch 8, the several discs being individually adjustable on a shaft 9 in order that the notches may be angularly disposed in a desired manner. Similarly each disc 4 of the second selector disc assembly is provided with a peripheral notch 10, the several discs being individually adjustable on a shaft 11.

Means are provided for rotating the shafts 9 and 11 and their respective disc assemblies 3 and 4 first in a forward direction indicated by arrows "F" on the drawings and then in a reverse direction indicated by arrows "R" to complete each cycle of operation. As will be hereinafter further described, the rotation of shaft 9 and discs 3, either in the forward or the reverse direction, is effectively completed before like rotation of shaft 11 and discs 4 begins. For stopping the first selector disc assembly 3 in a predetermined angular position, each stop is provided with a part 12 which is adapted to engage the notch 8 of disc 3, and for stopping the second selector disc assembly in a predetermined angular position each stop lever is provided also with a part 13 which is adapted to engage the notch 10 of disc 4. A spring 14 is provided for each stop lever and is adapted to urge the same about its pivotal point 1' so that in the first instance cam follower 7 is caused to ride on the periphery of its corresponding cam disc 2. Cam discs 2 are moved only in a forward direction and upon the dropping of cam follower 7 into notch 6, as rotation of cam discs 2 is suspended, and upon subsequent rotation of disc assembly 3 and then of disc assembly 4—each in a reverse direction—stop lever part 12 will ride on the periphery of disc 3 until it drops into notch 8 whereupon lever part 13 is caused to ride on the periphery of disc 4 until it drops into notch 10.

The engagement of part 12 in notch 8 and that of part 13 in notch 10 will lock the respective selector disc assemblies against further rotation so that their shafts 9 and 11 will be angularly disposed in a predetermined manner. Any desired variable element of the radio equipment used in conjunction with the automatic selector mechanism may be coupled mechanically to each of the selector disc shafts 9 and 11 by suitable means. For example, a band switch and a tuning condenser may be coupled to the shafts 9 and 11, respectively, as more fully described in the aforementioned Eskuchen application.

The source of motive power for actuating the several disc assemblies is a reversible motor represented at 15. Driven by the motor is a pinion 16 which is in mesh with a gear 17 adapted to drive shaft 9 of the first selector disc assembly. In mesh with gear 17 is a gear 18 freely mounted on shaft 5 of the cam disc assembly for rotation relative thereto. By means of a pawl 19 carried by gear 18 and a single-tooth ratchet wheel 20 affixed to the shaft 5, the cam disc assembly is rotated in only one direction, which corresponds with the forward direction of rotation of disc assemblies 3 and 4. In one successful use of my invention the gear ratio 17—18 was such as to drive shaft 5 nearly twice as fast as shaft 9. By means of an idler gear 21 the gear 17 drives a similar gear 22 which is adapted to drive shaft 11 of the second selector disc assembly through a lost-motion connection consisting of pin 100 on gear 22 and a lug 102 formed on a disc 104 which is provided with a bushing 105 carried on shaft 11. Interposed in the drive between gear 17 and shaft 9 and between disc 104 and shaft 11 is a friction slip clutch shown diagrammatically at 23.

Prior to the beginning of each cycle of operation of my invention, the selector disc assemblies 3 and 4 are locked by engagement of parts 12 and 13 on the particular lever 1, selected in the last previous cycle of operations, with notches 8 and 10 of the corresponding selector discs 3 and 4. In Fig. 1 the disc assemblies 3 and 4 may be considered as locked in the positions shown by a lever 1, other than that shown, whose follower 7 rests in a notch 6 of the corresponding cam disc 2. As shown in Fig. 1, a relatively small forward rotation of disc assembly 3 will bring lug 110 which is fixed relative to shaft 9 against a fixed stop 112, and it also happens that a relatively small forward rotation of disc assembly 4 will bring a lug 120 against a fixed stop 122. This means that in the last previous cycle of operations and while being rotated in reverse direction both shaft 9 and shaft 11 and their respective disc assemblies were interlocked with the selected lever 1 before they had gone far from their "homing" positions. However, as will be further described, gears 17 and 22 are always rotated in the reverse direction far enough to enable disc assembly 3 to be locked in any selected position between limits determined by engagement of lug 110 with stops 112 and 114 respectively, and to enable disc assembly 4 to be locked in any selected position limited respectively by engagement of lug 120 with stop 122 and by engagement of a second lug 124 also fixed relatively to shaft 11 with the other side of stop 122. At the end of each cycle of operation the pawl 19 will usually occupy some position spaced from the tooth of ratchet wheel 20, and pin 100 will engage the end 101 of lug 102.

At the beginning of each cycle of operation, energization of motor 15 rotates gears 17, 18 and 22 in their forward directions indicated by the arrows F. However, the cam disc assembly 2 will not be rotated until the pawl 19 has been engaged with the tooth of ratchet wheel 20, and gear 22 will first carry its pin 100 away from lug 102 and, in any event, selector disc assembly 4 cannot yet rotate because it is locked by part 13 of lever 1. Selector disc assembly 3 can at this time move only to the extent of the lost-motion of part 12 in the notch 8. However, when pawl 19 has engaged its ratchet tooth to operate the cam disc assembly, the base portion of notch 6 acting on follower 7 forces the lever 1 which became effective in the last previous cycle of operation out of engagement with discs 3 and 4, prior to which there may be slippage in the drive to one or both of shafts 9 and 11. After the lever 1 has been disengaged from the corresponding discs 3 and 4, forward rotation of gears 17, 18 and 22 is continued over an interval assuring that selector disc assemblies 3 and 4 will be brought to their homing positions determined respectively by engagement of lug 110 with stop 112 and engagement of lug 120 with stop 122. Disc assembly 4 is driven to its homing position by engagement of pin 100 with the end 103 of lug extension 102. Also, after selector disc assemblies 3 and 4 have reached their homing positions, the drives to them slip while the cam assembly 2 is turned an additional fraction of a revolution to bring it into such a position that it permits the desired lever 1 to engage its corresponding disc 3 and 4. Rotation of the cam assembly 2 then ceases. At the instant that the cam assembly reaches this position the driving motor is caused to reverse its direction of rotation. The shaft of the cam assembly does not turn when the motor is operated in the reverse direction, pawl 19 being, however, moved away from the ratchet tooth. Gear 17 is moved in a reverse direction to an extent such as to move its selector disc assembly through a cycle permitting any selected cam 3 to be engaged with part 12 of the corresponding lever 1. During this movement of gear 17 and consequently of gear 22, the pin 100 on gear 22 is moving toward the end 101 of lug 102 and after reverse rotation of disc assembly 3 has been wholly or substantially completed, gear 22 rotates disc assembly 4 in a reverse direction until it also is locked in by the selected lever 1. Since the selector disc assemblies will be stopped at different times the motor is permitted through the slip clutches 23 to continue operation until after the final disc assembly is stopped.

The mechanism for controlling the sequential operation of the several disc assemblies in accordance with my invention will now be described in connection with Fig. 2. The manual control switch which initiates operation of the mechanism is indicated at RS. As shown, the control switch consists of rotor 24 provided with a radially projecting contact 25 and a plurality of stationary brush contacts 1 to 10 which correspond to the number of predetermined positions of adjustment of the selector disc assemblies. In sliding contact with rotor 24 is a brush contact 11 which is connected to the + terminal of a low voltage source, marked 28V. Manifestly, other appropriate operating voltage may be employed.

Shown at S1 is a so-called "homing" switch which consists of a rotor 26 provided in its periphery with an indentation or insulating portion 27, a plurality of stationary brush contacts 1 to 10, and an additional brush contact 11 in sliding contact with the rotor 26. The brush contacts 1 to 10 of switch RS are electrically connected to the correspondingly numbered contacts of switch S1 by means of a 10-conductor cable represented at C.

Homing switch S1, like the cam disc assembly, is driven through a pawl 19' and a single-tooth ratchet 20', the associated gear 18' of which is driven by the motor-driven gear 16 through an idler 17' (Fig. 1). The gear trains and the pawl and ratchet drives are similar for both the homing switch and the cam assembly. They will therefore rotate in phase and at the same speed. In other words, for a particular angular displacement of the indentation 27 in switch rotor 26 there will result an equal angular displacement of the cam disc assembly. The homing switch rotor 26, however, is so adjusted with respect to the cam assembly that upon the arrival of the rotor indentation 27 opposite to any one of the switch contacts 1 to 10, the cam assembly will have been rotated to a position at which the peripheral notch 6 of the cam disc corresponding to the rotated switch position will be positioned to receive the cam follower 7 of the corresponding stop lever.

Shown at S2 is a limit switch which consists of a disc-shaped rotor 28 provided in its periphery with a cut-out or insulating portion 29, and a pair of brush contacts 30 and 31. The former is adapted to ride on the periphery of the rotor while the latter, which is connected to the + terminal of source 28V, is in continuous sliding contact with the rotor. The central insulating portion 32 of the rotor carries a pin 33 which projects from the rear side thereof. The purpose of pin 33 will be described later. As shown in Fig. 1, switch S2 is driven from gear 18' through suitable reduction gearing represented by the gear train 34. Switch S2 may thus rotate in either direction at a slower speed than switch S1. In a particular embodiment the gear reduction employed was 4 to 1 although it may be varied to meet specific requirements.

At S3 there is shown a switch which consists of a disc-shaped rotor 35, provided on its periphery with an elongated peripheral cut-out 36, and a pair of contacts 37 and 38. The former is adapted to ride on the periphery of the rotor while the latter, which is connected to the + terminal of source 28V, is in continuous sliding contact with the rotor. Carried on the central insulating portion 39 of rotor 35 is a pair of suitably spaced projections or lugs 40 and 41. Switch S3 is mounted on the same center as S2 but its rotor is not driven by the same means that drives S2. Instead, when S2 is driven in the forward direction, indicated by the arrow marked F, S3 does not move until the pin 33 on the rotor of S2 is turned far enough to strike projection 40 on the rotor of S3. When switch S2 is rotated in the reverse direction, indicated by the arrow marked R, S3 will again remain stationary until pin 33 comes in contact with projection 41 and returns the rotor of S3 to its original or circuit-closing position.

At S4 there is shown a 2-pole, double-throw switch which is under the control of a motor relay 42, the poles being designated M1 and M2. Pole M1 is connected to ground and is operative between a pair of contacts 43 and 44, and pole M2 is electrically connected to brush contact 11 of switch S1 and is operative between a pair of contacts 45 and 46.

At S5 there is shown a 4-pole, double-throw switch which is under the control of a reversing relay 47, the poles being designated R1, R2, R3 and R4. Pole R1 is operative between a pair of contacts 48 and 49 and is connected to the contact 43 associated with pole M1 and also to one terminal of the armature of motor 15. Pole R2 is operative between a pair of contacts 50 and 51 and is connected to the other terminal of the motor armature and also to a conductor 59 which is connected to the + terminal of the voltage source 28V. The contacts 48 and 51 are connected together and to one terminal of the motor field winding MF, and the contacts 49 and 50 are also connected together and to the other terminal of the motor field winding, so that in one pole position of R1 and R2 field winding MF may be energized in one direction and in the other pole position the field winding may be energized in the opposite direction, the direction of energization determining the direction of motor operation. Pole R3 is operative between a blank contact 53 and a contact 52 which is connected to one terminal of reversing relay 47 and to contact 46, the pole itself being connected to contact 45 of pole M2 and also to the brush contact 37 associated with switch S3. Pole R4 is operative between a blank contact 55 and a contact 54 which is connected to one terminal of motor relay 42 and also to brush contact 30 of switch S2, the pole itself being connected to conductor 59 and to the pole R2.

A complete cycle of operation will now be described, the several elements in Fig. 2 being shown in their positions at the completion of a previous cycle. Let it be assumed that it is desired to adjust the band switch and the tuning condenser which are actuated respectively by the shafts 9 and 11, each to a predetermined adjustment corresponding to position 2 of the manual remote control switch RS, and let it be assumed further that the cam disc 2 in Fig. 1 is the one that is set for position 2. The operator will rotate switch RS to the position 2 at which position the projection 25 contacts brush 2. This closes a circuit through the reversing relay 47 as follows: from + terminal of the voltage source 28V, brush contact 11 of switch RS, rotor 24, contacts 25 and 2, through the connecting cable-conductor to contact 2 of switch S1, brush contact 11 of S1, to pole M2 of switch S4, contact 46 to one terminal of reversing relay winding 47, the other terminal of which is grounded, as is the − terminal of source 28V. As a result the reversing relay is energized and the several poles are actuated to their lower contact positions. Poles R1 and R2 then permit the application of current to the field MF in proper polarity to cause the motor to rotate in the forward direction. Pole R3 in contact with 52 closes a circuit from the source through switch S3 in the closed condition to the reversing relay 47 to constitute a holding circuit therefor, this circuit being in parallel with the circuit of the reversing relay through S1 mentioned above. Pole R4 in contact with 54 energizes the motor relay 42.

With the energization of the motor relay 42, poles M1 and M2 are actuated to their lower contact positions, M1 completing the motor energizing circuit and M2 connecting switch S1 in parallel with switch S3 between the + terminal of the source and contact 45, the latter being connected to reversing relay 47 through pole R3 when on contact 52. The disengagement of pole M1 from contact 44 may be used to disable the radio transmitter, receiver or other controlled apparatus during the frequency changing cycle.

The first effective operation after the motor starts in its forward direction is the simultaneous engagement of pawls 19 and 19' with their respective ratchet wheels. By operation of cam disc assembly 2 by pawl 19, the particular lever 1, selected on the last previous cycle of operation, is lifted out of locking engagement with selector disc assemblies 3 and 4, thereby enabling the disc assemblies to be rotated in the forward direction to their homing positions. Meanwhile, switches S1 and S2 are rotated in a forward direction, movement of switch S1 being at first ineffective for reasons hereinafter set forth. Such rotation closes switch S2 to provide a parallel circuit through the motor relay 42 to keep it energized so long as switch S2 is closed, irrespective of the position of the reversing relay switch S5, switch S1, or other parts. After the parts have rotated through a range assuring that the selector disc assemblies have reached their homing positions, regardless of the position at which they may have been set in the preceding cycle, switch S3 is opened by engagement of pin 33 on switch S2 with projection 40 on switch S3. After switch S3 has been opened, the reversing relay 47 remains energized only by the series circuit through the closed control switch RS, the closed switch S1, pole M2 on contact 45, pole R3 on contact 52, and the winding of the reversing relay. Cam disc assembly 2 and switch S1 continue their rotation, and the next time, after switch S3 is opened, that indentation 27 in the rotor of switch S1 comes opposite to its brush contact 2 the circuit through switch S1 is opened, and the reversing relay 47 is deenergized, returning poles R1, R2, R3 and R4 to the positions shown in Fig. 2. Since we have assumed that the cam disc 2 diagrammatically shown in Fig. 1 is operative in the No. 2 position of switches RS and S1, it will now be stopped with the follower 7 of lever 1 seated in its notch 6. Upon opening of switch S5, the connections to the motor field MF are reversed to operate the motor in the reverse direction, during which cam assembly 2 and homing switch S1 remain stationary. The length of the peripheral cut-out portion 36 of switch S3 is so related to the 4-to-1 ratio of drive of switch S1 to switch S3 that switch S1 may complete a full rotation before switch S3 is turned far enough in a forward direction to be again closed. Accordingly, after the opening of switch S3, switch S1 will reach any position from contact brush 1 to contact brush 10, corresponding with the setting of control switch RS, before switch S3 can be again closed.

The motor will continue to rotate selector disc assemblies 3 and 4 and switch S2 in the reverse direction until switch S2 opens, the switch S2 being rotated in the reverse direction through the gear train 16, 17', 18', and reduction gearing 34. The extent of such rotation under the control of switch S2 is such as to assure reverse rotation of selector disc assemblies 3 and 4 through a range assuring locking engagement with parts 12 and 13 respectively of the selected lever 1. Opening of switch S2 deenergizes motor relay 42, causing the return of pole M1 to the position shown, thereby stopping the motor. Shortly before the opening of switch S2, pin 33 coacts with projection 41 to close switch S3 in preparation for the next cycle. This will have no effect on reversing relay 47 since pole R3 is now in the open position.

This arrangement secures reliability of operation regardless of the order of selection of the adjustments for which the apparatus is set. If, for example, one wishes to change from one position to another position which utilizes the notch 6 of a cam disc 2 which is only one step removed, in the forward movement of cam disc assembly 2, from the cam disc effective in the preceding cycle of operation, the change in position of the control switch RS which initiates such movement of the cam disc assembly immediately establishes a circuit through pole R4 to the motor relay 42 with a reversing relay holding circuit through switch S3, after which the motor relay circuit cannot again be opened until switch S2 has completed its cycle of operation. During such cycle of operation, the cam disc assembly will be moved through one or more complete rotations in going from the notch 6 in one of the discs to the notch 6 in the adjoining cam disc. With the gear ratios hereinbefore specified, the cam disc assembly 2 and homing switch S1 will make more than two full rotations between the closing of switch S2 at the beginning of each cycle of operations and the opening of switch S3 preparatory to reversal of the motor 15.

The control system above described has a number of desirable features, of which the following may be mentioned.

1. The series circuit through S3 and reversing relay pole R3 keeps the reversing relay closed, once it has closed, regardless of how quickly the indentation in switch S1 passes the energized position.

2. Pole R4 of the reversing relay supplies power to the motor relay so long as the reversing relay is closed, which means that switch S2 does not have to be quick closing.

3. The use of pole M2 of the motor relay to connect the take-off brush contact 11 of switch S1 directly to the coil of reversing relay 47 when the motor relay 42 is not energized, and through pole R3 of the reversing relay when energized results in S1 being connected to the coil of the reversing relay only when both relays are energized or when both relays are deenergized. When the motor relay is energized and the reversing relay deenergized, as during the reverse cycle, switch S1 is disconnected and any change in the position of RS during this period will have no effect until the end of that cycle, at which time, a new cycle will start. Without this feature, a change in the position of RS during the reverse cycle would cause the mechanism to immediately make a new short, forward cycle which might not be sufficiently long to completely clear the selector and might result in the selector ending up in an incorrect position.

4. As already indicated, the size of the cut-out 36 in the rotor of S3 is such that S1 may make a complete revolution before S3 would again close while continuing to go in the forward direction. Normally the motor would reverse before S3 would reclose or S2 reopen while going in a forward direction, but should some unusual condition, such as a change in position of RS at that particular instant, permit S2 to continue long enough in the forward direction to reopen S3, the mechanism will merely make another cycle in the forward direction due to the fact that S3 will have reclosed before S2 opened, which will keep both the reversing relay and the motor relay energized.

5. Should the power go off during the forward part of the cycle, the return of power will cause the system to start up in the reverse direction until S2 opens, whereupon it will repeat a complete cycle. Should power go off during the reverse part of the cycle, the return of power will cause the completion of the cycle.

6. The polarity of the system may be reversed without affecting its operation, that is, all points shown as ground may be made + 28V. (or any other voltage suitable for operating the relays and motor) and all points shown connected to + 28V. may be made ground.

While I have shown and described a preferred embodiment of my invention, it will be understood that various modifications and changes will occur to those skilled in the art without departing from the spirit and scope of his invention. I therefore contemplate by the appended claims to cover any such modifications as fall within the true spirit and scope of my invention.

What I claim is:

1. An electric control system comprising a multiposition selector switch, a reversible electric motor operable in forward and reverse directions, a homing switch adjustable by rotation in one direction only, means operable upon adjustment of the selector switch for effecting operation of the motor in the forward driving direction, means actuated by the motor in the forward driving direction including a pawl and ratchet for driving the homing switch in said one direction, means operable upon adjustment of said homing switch to a position corresponding to the setting of the selector switch for effecting operation of the motor in the reverse direction, and a limit switch actuated by the homing switch driving means operating in the forward driving direction of the motor for keeping the motor energized and actuated by the homing switch driving means operating in the reverse driving direction of the motor for deenergizing the motor, said limit switch being in the form of a rotary switch which is actuated by the homing switch driving means in synchronism therewith and exclusive of the pawl and ratchet.

2. An electric control system comprising a multiposition selector switch, a reversible electric motor operable in forward and reverse directions, a motor starting relay and a motor reversing relay, a switch under the control of the starting relay adapted in the deenergized state to open the motor circuit and in the energized state to close the motor circuit, switches under the control of the reversing relay adapted in the deenergized state to apply certain polarities to the motor field and to open the starting relay circuit and adapted in the energized state to reverse the polarities to the motor field and to close the starting relay circuit, a homing switch adjustable by rotation in one direction only, means operable upon adjustment of the selector switch for energizing both the reversing relay and the starting relay to thereby effect operation of the motor in the forward driving direction, means actuated by the motor in the forward driving direction for driving the homing switch in said one direction, means operable upon adjustment of said homing switch to a position corresponding to the setting of the selector switch for deenergizing the reversing relay and causing operation of the motor in the reverse direction, and a limit switch actuated by the homing switch driving means operating in the forward driving direction of the motor for keeping the motor energized and actuated by the homing switch driving means operating in the reverse driving direction of the motor for deenergizing the motor.

3. An electric control system comprising a multiposition selector switch, a reversible electric motor operable in forward and reverse directions, a motor starting relay and a motor reversing relay, a switch under the control of the starting relay adapted in the energized state to close the motor circuit and in the deenergized state to open the motor circuit, a switch under the control of the reversing relay adapted in the energized state to close the starting relay circuit and in the deenergized state to open the starting relay circuit, a homing switch adjustable by rotation in one direction only, means operable upon adjustment of the selector switch for energizing both the reversing relay and the starting relay to effect operation of the motor in the forward driving direction, means actuated by the motor in the forward driving direction for driving the homing switch in said one direction, means operable upon adjustment of said homing switch to a position corresponding to the setting of the selector switch for deenergizing the reversing relay to thereby cause operation of the motor in the reverse direction, and a limit switch actuated by the homing switch driving means operating in the forward driving direction of the motor arranged to complete a holding circuit for the motor starting relay, said holding circuit being effective after the reversing relay is deenergized, and actuated by the homing switch driving means operating in the reverse driving direction of the motor to open said holding circuit and thereby deenergize the starting relay.

4. An electric control system comprising a multi-position selector switch, a reversible electric motor operable in forward and reverse directions, a motor starting relay and a motor reversing relay, a switch under the control of the starting relay adapted in the energized state to close the motor circuit and in the deenergized state to open the motor circuit, a switch under the control of the reversing relay adapted in the energized state to close the starting relay circuit and in the deenergized state to open the starting relay circuit, a homing switch adjustable by rotation in one direction only, means operable upon adjustment of the selector switch for energizing both the reversing relay and the starting relay to effect operation of the motor in the forward driving direction, means actuated by the motor in the forward driving direction for driving the homing switch in said one direction, means operable upon adjustment of said homing switch to a position corresponding to the setting of the selector switch for deenergizing the reversing relay to thereby cause operation of the motor in the reverse direction, a limit switch actuated by the homing switch driving means operating in the forward driving direc- tion of the motor to maintain the starting relay in the energized state and actuated by the homing switch driving means operating in the reverse driving direction of the motor to deenergize the starting relay, and a switch actuated by the limit switch in timed relation for completing a holding circuit for the reversing relay for at least the first revolution of the homing switch.

5. An electric control system comprising a multi-position selector switch, a reversible electric motor operable in forward and reverse directions, a motor starting relay and a motor reversing relay, a switch under the control of the starting relay adapted in the energized state to close the motor circuit and in the deenergized state to open the motor circuit, a switch under the control of the reversing relay adapted in the energized state to close the starting relay circuit and in the deenergized state to open the starting relay circuit, a homing switch adjustable by rotation in one direction only, means operable upon adjustment of the selector switch for energizing both the reversing relay and the starting relay to effect operation of the motor in the forward driving direction, means actuated by the motor in the forward driving direction for driving the homing switch in said one direction, means operable upon adjustment of said homing switch to a position corresponding to the setting of the selector switch for deenergizing the reversing relay to thereby cause operation of the motor in the reverse direction, a limit switch actuated by the homing switch driving means operating in the forward driving direction of the motor arranged to complete a holding circuit for the motor starting relay, said holding circuit being effective after the reversing relay is deenergized, and actuated by the homing switch driving means operating in the reverse driving direction of the motor to open said holding circuit and thereby deenergize the starting relay, and a switch actuated by the limit switch in timed relation for completing a holding circuit for the reversing relay for at least the first revolution of the homing switch.

6. An electric control system comprising a reversible electric motor operable in forward and reverse directions, a motor starting relay and a motor reversing relay having switches arranged to be connected in circuit with said motor, the motor being operable in the forward direction when both said relays are energized and operable in the reverse direction when only the starting relay is energized, a multi-position selector switch manually settable to a desired position, a homing switch adapted to be driven by said motor in the forward driving direction thereof to an adjusted position corresponding to the setting of the selector switch and adapted in the reverse driving direction to be left in said adjusted position, means for energizing the motor starting relay through a switch of the reversing relay, means for energizing the motor reversing relay through the selector switch and the homing switch, and a limit switch actuated by the homing switch driving means operating in the forward driving direction of the motor for keeping the motor energized and actuated by said driving means operating in the reverse driving direction of the motor for deenergizing the starting relay to thereby terminate operation of the motor.

7. An electric control system in accordance with the invention defined in claim 6, wherein the motor reversing relay is adapted to be energized by either one or another of two parallel circuits, one through the selector switch, homing switch and a switch of the motor starting relay in the deenergized state, and the other parallel circuit through a switch of the reversing relay in the energized state and a switch under the control of the limit switch.

8. An electric control system in accordance with the invention defined in claim 6 wherein the motor starting relay is adapted to be energized by either one, or both, of two parallel circuits, one through a switch of the reversing relay in the energized state, and the other parallel circuit through the limit switch.

9. An electric control system in accordance with the invention defined in claim 6, wherein the motor reversing relay is adapted to be energized by either one or another of two parallel circuits, one through the selector switch, homing switch and a switch of the motor starting relay in the deenergized state, and the other parallel circuit through a switch of the reversing relay in the energized state and a switch under the control of the limit switch, and wherein the motor starting relay is adapted to be energized by either one, or both, of two parallel circuits, one through a switch of the reversing relay in the energized state, and the other parallel circuit through the limit switch.

10. A control system for selectively adjusting from a remote point a first rotatable element to one of a plurality of positions and a second rotatable element to a position determined by the adjustment of the first element, comprising a multiposition selector switch at a remote point, a reversible electric motor operable in forward and reverse directions, a homing switch movable with the first element and adjustable together by rotation in one direction only, means including a motor starting relay and a reversing relay operable when both relays are energized for effecting operation of the motor in the forward driving direction, means operable in the forward driving direction of the motor for driving the second element to a home position and for driving the homing switch and first element to a position corresponding to the setting of the remote selector switch, means operable upon adjustment of said homing switch to the latter position for deenergizing the reversing relay only to thereby effect operation of the motor in the reverse direction, means operable in the reverse driving direction of the motor for rotating the second element to a position determined by the adjustment of the first element, and a limit switch actuated in the reverse driving direction of the motor for deenergizing the starting relay to thereby terminate operation of the motor.

11. A control system for use in conjunction with a pre-selector mechanism of the type provided with a cam disc assembly, a series of stop levers and a selector disc assembly, the angular adjustment of the cam assembly determining the selective actuation of the particular stop lever that is to be effective to coact with the corresponding disc of the selector assembly for stopping the latter in one of a plurality of determined angular positions, said system comprising a multi-position selector switch settable to positions corresponding to the several positions of the selector assembly, a homing switch movable in phase with the cam assembly and adjustable together by rotation in one direction only, means including a motor starting relay and a reversing relay operable when both relays are energized for effecting operation of the motor in the forward driving direction, means operable in the forward driving direction of the motor for driving the selector disc assembly to a home position and for driving the homing switch and the cam assembly to a position corresponding to the setting of the selector switch, means operable upon adjustment of said homing switch to the latter position for deenergizing the reversing relay only to thereby effect operation of the motor in the reverse direction, means operable in the reverse driving direction of the motor for rotating the selector disc assembly to a position determined by the adjustment of the cam assembly, and a limit switch actuated in the reverse driving direction of the motor for deenergizing the starting relay to thereby terminate operation of the motor.

12. An electric control system comprising a multi-position selector switch, a reversible electric motor operable in forward and reverse directions, a motor starting relay and a motor reversing relay, a first switch under the control of the starting relay adapted in the deenergized state to open the motor circuit and in the energized state to close the motor circuit, a second switch under the control of the starting relay adapted in the deenergized state to be connected to the reversing relay winding and in the energized state to be connected to a contact connected to a source of operating potential through switches under the control of the reversing relay adapted in the deenergized state to apply certain polarities to the motor field for operating the motor in the forward direction and adapted in the energized state to reverse the polarities to the motor field for operating the motor in the reverse direction, a third switch under the control of the reversing relay adapted when energized to close the starting relay circuit, a fourth switch under the control of the reversing relay adapted when energized to complete a holding circuit through the reversing relay, a homing switch adjustable by rotation in one direction only, means operable upon adjustment of the selector switch for energizing both the reversing relay and the starting relay to thereby effect operation of the motor in the forward driving direction, means actuated by the motor in the forward driving direction for driving the homing switch in said one direction, means operable upon adjustment of said homing switch to a position corresponding to the setting of the selector switch, said homing switch adjustment causing deenergizing of the reversing relay and causing operation of the motor in the reverse direction, and a limit switch actuated by the homing switch driving means operating in the forward driving direction of the motor for keeping the motor energized and actuated by the homing switch driving means operating in the reverse driving direction of the motor for deenergizing the motor.

OLIN L. MacSORLEY.

REFERENCES CITED

The following references are of record in the file of this patent:

UNITED STATES PATENTS

| Number | Name | Date |
|---|---|---|
| 2,285,414 | Collins | June 9, 1942 |